US010175567B2

United States Patent
Nishimori et al.

(10) Patent No.: US 10,175,567 B2
(45) Date of Patent: Jan. 8, 2019

(54) LIGHT SOURCE DEVICE INCLUDING A MAGNETIC OR CAPACITANCE DETECTING SENSOR AND AN IMAGE PROJECTION APPARATUS INCLUDING THE LIGHT SOURCE DEVICE

(71) Applicants: Takehiro Nishimori, Kanagawa (JP); Kazuhiro Fujita, Tokyo (JP); Toshiharu Murai, Kanagawa (JP); Tatsuya Takahashi, Tokyo (JP)

(72) Inventors: Takehiro Nishimori, Kanagawa (JP); Kazuhiro Fujita, Tokyo (JP); Toshiharu Murai, Kanagawa (JP); Tatsuya Takahashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/263,519

(22) Filed: Sep. 13, 2016

(65) Prior Publication Data
US 2016/0377969 A1 Dec. 29, 2016

Related U.S. Application Data

(63) Continuation of application No. PCT/JP2014/077371, filed on Oct. 15, 2014.

(30) Foreign Application Priority Data

Mar. 18, 2014 (JP) .................................. 2014-055347

(51) Int. Cl.
*G03B 21/20* (2006.01)
*F21V 9/30* (2018.01)
(Continued)

(52) U.S. Cl.
CPC ............ *G03B 21/2086* (2013.01); *F21V 3/00* (2013.01); *F21V 9/30* (2018.02); *F21V 23/003* (2013.01);
(Continued)

(58) Field of Classification Search
CPC .............. G03B 21/2033; G03B 21/204; G03B 21/2053; G03B 21/208; G03B 21/2086;
(Continued)

(56) References Cited

U.S. PATENT DOCUMENTS 7,377,656 B2 * 5/2008 Nojima .................. G03B 21/10
348/E5.139
7,393,107 B2 * 7/2008 Yonekubo .......... G03B 21/2086
348/818
(Continued)

FOREIGN PATENT DOCUMENTS

| CN | 101846250 A | 9/2010 |
| CN | 102314060 A | 1/2012 |

(Continued)

OTHER PUBLICATIONS

Extended European Search Report dated Feb. 23, 2017.
(Continued)

*Primary Examiner* — Bao-Luan Le
(74) *Attorney, Agent, or Firm* — Harness, Dickey & Pierce, P.L.C.

(57) ABSTRACT

A light source device includes a light source section that emits laser beam, a member reducing light quantity unevenness of the laser beam, a diffusion member that is provided in a traveling optical path of the laser beam between the light source section and the member reducing light quantity unevenness and diffuses the laser beam, a detection element that detects a physical characteristic of the diffusion member and outputs a state detecting signal, and an abnormal state determiner that determines an abnormal state of the diffusion member based on the state detecting signal.

13 Claims, 11 Drawing Sheets

(51) Int. Cl.
  *H04N 9/31* (2006.01)
  *F21V 3/00* (2015.01)
  *F21V 23/00* (2015.01)
  *G02B 5/02* (2006.01)
(52) U.S. Cl.
  CPC ......... *G03B 21/204* (2013.01); *G03B 21/208* (2013.01); *G03B 21/2033* (2013.01); *H04N 9/3114* (2013.01); *H04N 9/3158* (2013.01); *H04N 9/3161* (2013.01); *G02B 5/02* (2013.01)
(58) Field of Classification Search
  CPC .. H04N 9/3129–9/3135; H04N 9/315–9/3167; G02B 5/02–5/0294; G02B 5/0236; G02B 5/0273; G02B 5/0278
  See application file for complete search history.

(56) References Cited

U.S. PATENT DOCUMENTS

| | | | |
|---|---|---|---|
| 7,419,266 B2* | 9/2008 | Seki | G03B 21/2086 348/818 |
| 7,494,227 B2* | 2/2009 | Yamazaki | H04N 9/3129 348/819 |
| 8,033,669 B2* | 10/2011 | Endo | G03B 21/10 353/119 |
| 8,157,387 B2* | 4/2012 | Yonekubo | G03B 21/2086 353/74 |
| 9,185,372 B2* | 11/2015 | Takahashi | H04N 9/3114 |
| 9,769,439 B2* | 9/2017 | Toyooka | H04N 9/3155 |
| 9,869,856 B2* | 1/2018 | Inoue | G02B 26/008 |
| 2004/0036970 A1 | 2/2004 | Kamei | |
| 2005/0007562 A1* | 1/2005 | Seki | G03B 21/2086 353/98 |
| 2006/0028622 A1* | 2/2006 | Nojima | G03B 21/10 353/75 |
| 2006/0244925 A1* | 11/2006 | Seki | G03B 21/2086 353/52 |
| 2007/0008501 A1* | 1/2007 | Yamazaki | H04N 9/3129 353/97 |
| 2008/0180643 A1 | 7/2008 | Endo et al. | |
| 2009/0033884 A1* | 2/2009 | Yonekubo | G03B 21/2086 353/85 |
| 2010/0220299 A1* | 9/2010 | Mizushima | G03B 21/006 353/38 |
| 2010/0245776 A1 | 9/2010 | Yamamoto | |
| 2011/0084609 A1 | 4/2011 | Kawaguchi et al. | |
| 2011/0304833 A1 | 12/2011 | Osaka et al. | |
| 2012/0002172 A1* | 1/2012 | Ikeda | G03B 21/16 353/20 |
| 2012/0229522 A1 | 9/2012 | Isobe | |
| 2013/0010264 A1* | 1/2013 | Takahashi | H04N 9/3114 353/20 |
| 2013/0083295 A1 | 4/2013 | Miyazaki | |
| 2013/0308104 A1 | 11/2013 | Nishimori et al. | |
| 2014/0028983 A1 | 1/2014 | Fujita et al. | |
| 2014/0036241 A1 | 2/2014 | Nishimori et al. | |
| 2014/0049755 A1 | 2/2014 | Nishimori et al. | |
| 2014/0071182 A1 | 3/2014 | Takahashi et al. | |
| 2014/0071407 A1 | 3/2014 | Takahashi et al. | |
| 2014/0071408 A1 | 3/2014 | Takahashi et al. | |
| 2014/0192331 A1* | 7/2014 | Toyooka | G03B 21/006 353/85 |
| 2014/0240679 A1 | 8/2014 | Nishimori et al. | |
| 2014/0240680 A1 | 8/2014 | Nishimori et al. | |
| 2014/0268068 A1 | 9/2014 | Takahashi et al. | |
| 2014/0268069 A1 | 9/2014 | Takahashi et al. | |
| 2014/0268072 A1 | 9/2014 | Takahashi et al. | |
| 2016/0306183 A1* | 10/2016 | Niederer | G02B 27/48 |
| 2016/0306269 A1* | 10/2016 | Gyoten | G03B 21/142 |
| 2017/0351099 A1* | 12/2017 | Ukai | G02B 27/0179 |

FOREIGN PATENT DOCUMENTS

| | | |
|---|---|---|
| CN | 102681199 A | 9/2012 |
| CN | 103033918 A | 4/2013 |
| JP | 2002-281532 | 9/2002 |
| JP | 2004-29566 | 1/2004 |
| JP | 2004-184802 | 7/2004 |
| JP | 2008-180921 | 8/2008 |
| JP | 2008-271423 | 11/2008 |
| JP | 2010-231063 | 10/2010 |
| JP | 2011-86432 | 4/2011 |
| JP | 2012-150212 | 8/2012 |
| JP | 2012-189858 | 10/2012 |
| JP | 2012-213562 | 11/2012 |
| JP | 2014-10181 | 1/2014 |
| WO | WO2007/138880 A1 | 12/2007 |

OTHER PUBLICATIONS

Chinese Office Action and English translation thereof dated Jan. 22, 2018.
International Search Report dated Jan. 13, 2015 in PCT/JP2014/077371 filed on Oct. 15, 2014.
Chinese Notification of Allowance and English translation thereof dated Aug. 15, 2018.

* cited by examiner

LIGHT SOURCE DEVICE INCLUDING A MAGNETIC OR CAPACITANCE DETECTING SENSOR AND AN IMAGE PROJECTION APPARATUS INCLUDING THE LIGHT SOURCE DEVICE

CROSS-REFERENCE TO RELATED APPLICATION

The present application is a continuation application of International Application No. PCT/JP2014/077371 filed Oct. 15, 2014, the entire contents of which are hereby incorporated herein by reference, which claims priority to Japanese priority application No. 2014-55347, filed on Mar. 18, 2014.

TECHNICAL FIELD

The present invention relates to a light source device and an image projection apparatus including the light source device.

BACKGROUND ART

An image projection apparatus (projector) that projects an image on a screen (viewing surface) by using image data of a personal computer, data of a video image, image data stored in a memory card, etc. is known today.

The image projection apparatus (projector) projects light emitted from a light source device on the screen by using a micro mirror displaying element which is used as a micro mirror device, a liquid crystal plate, or the like, and forms an image on the screen.

A high-brightness discharging lamp is mainly used as a light source for the conventional light source device in the image projection apparatus. However, in recent years, a light source device that combines a solid light-emitting element emitting excitation light and a phosphor absorbing the excitation light and converting it into fluorescence of a wavelength in a predetermined wavelength band as a light source is being developed.

A semi-conductive element such as a light-emitting diode (LED), a laser diode (LD), an organic EL, or the like is used for the solid light-emitting element. The light source device using this kind of the solid light-emitting element has advantageous effects that can improve color reproductivity, light-emitting efficiency, use efficiency of light, and the like and achieve life prolongation, compared to the discharging lamp.

In addition, a design of an optical system can be easily achieved in the light source device using this kind of the solid light-emitting element, and the light source device has also advantageous effects that can achieve simplification of color composition, a low numerical aperture (low NA) of a projection lens (reduction of numerical aperture), etc.

However, when a laser light source is used for the light source device of the image projection apparatus, laser beam is coherent light having a regular wave front and has a high straightness. It is therefore preferable for the image projection apparatus to take a configuration in which laser does not directly enter person's eyes.

It is also preferable that laser beam of high energy strength does not hit a person's skin. Products having laser light sources are classified by the International Electrotechnical Commission (IEC60825) and the Japanese Industrial Standard (JIS C6802:2005), and the guidance that manufactures and users should be observed for each class is established. The guidance thereby contributes to the improvement in the safety of the products having the laser light sources.

In a light source device including the laser light source, in the image projection apparatus, a diffusion member relieving energy density of laser beam is provided in a traveling optical path of the laser beam such that laser beam with high output is not directly leaked to an exterior of the image projection apparatus to contribute to the improvement in the safety to the laser beam.

However, if the diffusion member deviates from the traveling optical path of the laser beam due to the falling etc. of the image projection apparatus, the laser beam is directly leaked to the exterior and therefore the safety to the laser beam is reduced. There is therefore proposed an image projection apparatus including a drive device that integrally rotates a fluorescent member and the diffusion member, and a light-shielding member engaged with the diffusion member, and configured to disengage the light-shielding member from the diffusion member when the diffusion member deviates from the traveling optical path of the laser beam, to move the light-shielding member at a position where the diffusion member exists by a centrifugal force, and to shield the laser beam, to prevent laser beam with high output from leaking to the exterior when the diffusion member deviates (see Paten Literature 1).

Moreover, Patent Literature 1 discloses a configuration including a detecting device detecting that the diffusion member deviates from the traveling optical path of the laser beam, or a detecting device detecting that the light-shielding member moves, and stopping the light emission from a laser light source.

However, anyway, the image projection apparatus disclosed in Patent Literature 1 presupposes that the diffusion member deviates from the traveling optical path of the laser beam and does not consider a case where a part of the diffusion member breaks even if the diffusion member does not deviate from the traveling optical path of the laser beam such that the diffusion member does not exist in the traveling optical path of the laser beam in a normal state. A further improvement is required in planning the safety to the laser beam.

CITATION LIST

Patent Literature

Patent Literature 1: JP2010-231063A

SUMMARY

Technical Problem

An object of the present invention is to provide a light source device capable of contributing to improvement in safety to laser beam when a diffusion member does not exist in a traveling optical path of light beam in a normal state occurs, even if the diffusion member does not deviate from the traveling optical path of the light beam, and when the diffusion member deviates from the traveling optical path of the light beam.

Solution to Problem

A light source device according to the present invention includes a light source section that emits laser beam, a diffusion member provided in a traveling optical path of the laser beam and that transmits the laser beam while diffusing the laser beam, a detection element that detects whether the diffusion member exists in the traveling optical path of the laser beam in a normal state by a physical characteristic of the diffusion member and outputs a state detecting signal, and an abnormal state determiner that has a predetermined threshold to determine whether the diffusion member exists in the traveling optical path in a normal state and determines an abnormal state of the diffusion member by comparing the state detecting signal with the threshold.

Advantageous Effects of Invention

The present invention has an effect capable of contributing to improvement in safety to laser beam, when a diffusion member does not exist in a traveling optical path of light beam in a normal state even if the diffusion member does not deviate from the traveling optical path of the light beam, and when the diffusion member deviates from the traveling optical path of the light beam.

DESCRIPTION OF EMBODIMENTS

Embodiment 1

Embodiments of a light source device according to the present invention and an image projection apparatus including the light source device will be described hereinafter with reference to the accompanying drawings. FIGS. 1 to 6 are explanatory views of Embodiment 1 of the light source device according to the present invention.

Figure 1:
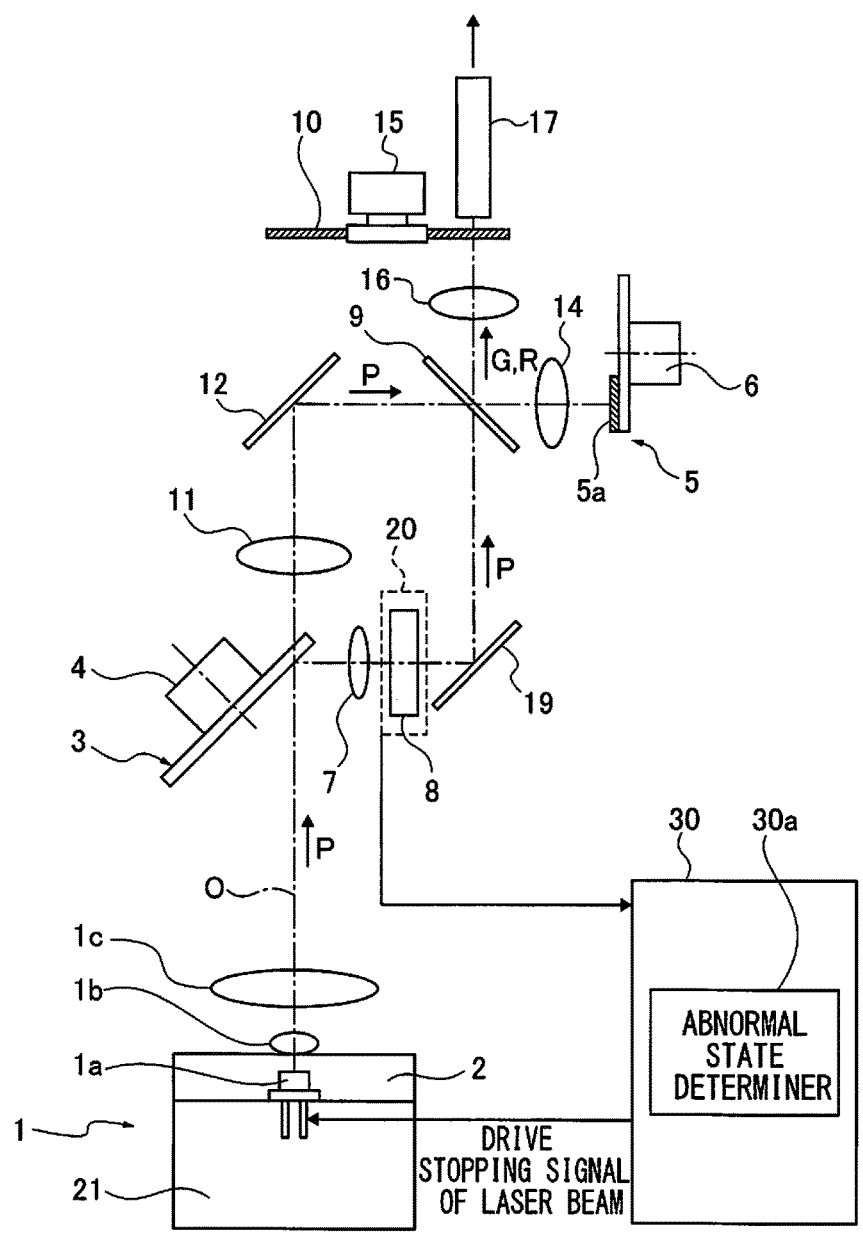
FIG. 1 is an optical view illustrating a main configuration of a light source device according to Embodiment 1 of the present invention.

FIG. 1 is an optical view of the light source device according to the present invention. In FIG. 1, reference numeral 1 denotes a light source section. The light source section 1 includes a laser diode (LD) 1a as a laser light source, a coupling lens 1b, and a focusing lens 1c.

The laser diode 1a is provided on a laser diode holder 2. The coupling lens 1b is provided on a front surface of the laser diode holder 2 to face the laser diode 1a. Here, a heat sink (heat-releasing plate) 21 is provided on a rear surface of the laser diode holder 2 to cool heat generated in the laser diode 1a. The heat sink 21 is made of a metal such as aluminum or copper.

Laser beam P emitted from the laser diode 1a is condensed by the coupling lens 1b and guided to the focusing lens 1c as a parallel luminous flux. The focusing lens 1c serves to focus the laser beam P formed as the parallel luminous flux by the coupling lens 1b.

Here, an explanation is made in which the laser diode 1a emits laser beam P of blue component. However, a laser diode emitting laser beam of green component or laser beam of red component may be used. Further, a light-emitting diode (LED) may be used, instead of the laser diode. Here, an explanation is made in which the single laser diode 1a and the single coupling lens 1b are used. However, a configuration using a plurality of laser diodes and a plurality of coupling lenses may be used as needed.

The laser beam P of blue component is guided to an optical path switching disc 3 which is used as an optical path switcher. The laser beam P is formed in a spot form on the optical path switching disc 3. The spot of the laser beam P is set to have a suitable dimension to prevent color mixture, etc.

Figure 2:
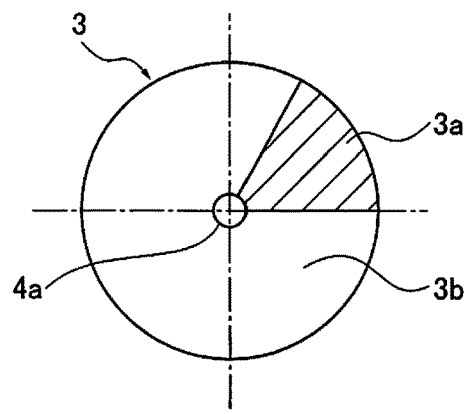
FIG. 2 is a plan view of an optical path switching disc illustrated in FIG. 1.
Figure 3:
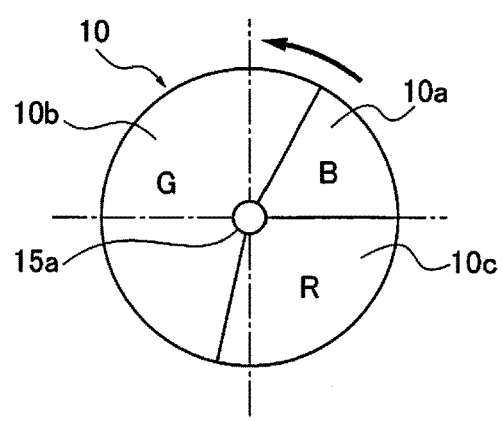
FIG. 3 is a plan view of a color component switching disc illustrated in FIG. 1.

The optical path switching disc 3 includes a rotation disc for optical path time-division. The rotation disc includes a reflection area 3a and a transmission area 3b which are divided in a rotation direction, as shown in FIG. 2. The optical path switching disc 3 is diagonally located to an optical axis O of the focusing lens 1c (here, 45 degrees to the optical axis).

The optical path switching disc 3 is rotated and driven by a stepping motor 4 which is used as a drive source, as shown in FIG. 1, for example. Here, reference numeral 4a in FIG. 2 denotes a drive shaft of the stepping motor 4.

A reflection film is provided on a surface of the reflection area 3a of the optical path switching disc 3. The laser beam P of blue component hits on the surface. On the other hand, an antireflection film is provided on a surface of the transmission area 3b of the optical path switching disc 3. The laser beam P of blue component hits on the surface.

A focusing lens 11, an optical path folding mirror 12, an optical path composite optical element 9, a focusing lens 14, and a phosphor wheel 5 are provided in a traveling optical path (second optical path) where the laser beam P of blue component transmitting the transmission area 3b travels.

The focusing lens 11 focuses the laser beam P of blue component irradiated on the transmission area 3b in the spot form by the focusing lens 1c and converts it into a parallel luminous flux. The laser beam P of blue component is reflected on the optical path folding mirror 12 toward the optical path composite optical element 9.

The optical path composite optical element 9 is configured with a dichroic mirror. The dichroic mirror has an optical characteristic transmitting the laser beam P of blue component and reflecting fluorescence G of green and fluorescence R of red which are described later, and severs to compose the laser beam P of blue component, the fluorescence G, and the fluorescence R.

The phosphor wheel 5 is configured with a rotation disc and is rotated and driven by a stepping motor 6 shown in FIG. 1. A ring-belt-shaped fluorescent film 5a is circumferentially provided on the phosphor wheel 5. A mixture of a material (material generating fluorescence of yellow) including fluorescent materials generating the fluorescence G of green component and the fluorescence R of red component by the excitation of the laser beam P of blue component is used in the fluorescent film 5a, but is not limited to this. For example, fluorescent materials having a fluorescent distribution characteristic ranging from a wavelength region of green component to a wavelength region of red component may be used.

The laser beam P of blue component transmitting the optical path composite optical element 9 is focused by the focusing lens 14 and irradiated to the fluorescent film 5a in the spot form. The fluorescent film 5a is excited by the laser beam P to generate the fluorescence G and the fluorescence R.

The fluorescence G, the fluorescence R, and a part of laser beam P reflected on the fluorescent film 5a are focused by focusing lens 14 and formed in parallel luminous fluxes, thereafter they are guided to the optical path composite optical element 9 again. The fluorescence G and the fluorescence R are reflected on the optical path composite optical element 9 and guided to a focusing lens 16. The part of the laser beam P reflected on the fluorescent film 5a transmits the optical path composite optical element 9 and is guided to the optical path folding mirror 12.

Note that a portion of the fluorescent film 5a to which the laser beam P is irradiated momentarily changes as the phosphor wheel 5 rotates. The deterioration of the fluorescent film 5a is therefore restrained. In addition, when the laser beam P is irradiated to fluorescent film 5a, the laser beam P is scattered on the phosphor wheel 5 and unable to be kept as the coherent light. Consequently, as long as the laser beam P is irradiated to fluorescent film 5a, there would not be a trouble in contemplating the safety for person's eyes.

A color component switching disc 10 is provided in a traveling optical path where the fluorescence G and the fluorescence R, which are focused by the focusing lens 16, travel. The color component switching disc 10 is rotated and driven by a stepping motor 15.

The color component switching disc 10 is configured with a rotation disc for color component time-division. The rotation disc is circumferentially divided into a fan-shaped area 10a transmitting the laser beam P of blue component in the rotation direction, a fan-shaped area 10b transmitting fluorescence of green component and absorbing or reflecting fluorescence of red component, and a fan-shaped area 10c transmitting fluorescence of red component and absorbing or reflecting fluorescence of green component. Here, reference numeral 15a in FIG. 3 denotes a drive shaft of the stepping motor 15.

The fluorescence G and the fluorescence R reflected on the optical path composite optical element 9, and the laser beam P of blue component transmitting the optical path composite optical element 9 are focused by the focusing lens 16, pass through the fan-shaped areas 10a, 10b, and 10c of the color component switching disc 10, and are guided to a light tunnel 17 which is used as a member reducing light quantity unevenness. Here, a fly-eye lens may be used, instead of the light tunnel 17.

Note that the fan-shaped area 10a which is the transmission area of the blue component of the color component switching disc 10 may be configured by a translucent glass, a cutout, or a filter transmitting only a wavelength band of blue component, for example.

A focusing lens 7, a diffusion member 8, and an optical path folding mirror 19 are provided in a traveling optical path (first optical path) where the laser beam P reflected on the reflection area 3a of the optical path switching disc 3 travels. The focusing lens 7 functions to convert the laser beam P of blue component reflected on the optical path switching disc 3 into a parallel luminous flux and guide it to the diffusion member 8.

Figure 4:
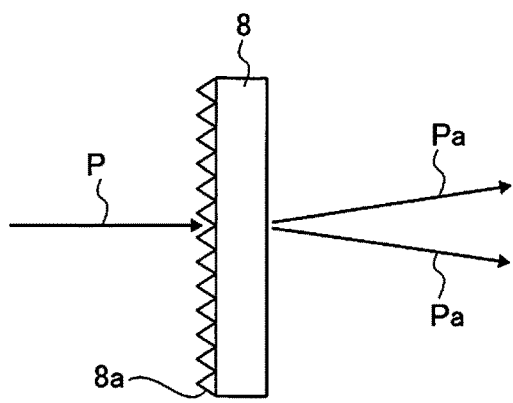
FIG. 4 is a schematic view of a diffusion member illustrated in FIG. 1, a configuration thereof being enlarged.

In Embodiment 1, the diffusion member 8 is formed by a dielectric such as a glass, a plastic, etc., having a dielectric characteristic as physical characteristic. The diffusion member 8 is provided with a diffusing surface 8a provided on a surface to which the laser beam P hits, as shown in FIG. 4. An antireflection film is provided on a side of the diffusing surface 8a where the laser beam P enters. The diffusing surface 8a is used to remove coherence property of the laser beam P.

The laser beam P is diffused on the diffusing surface 8a of the diffusion member 8 to generate diffusion light Pa. After the diffusion light Pa transmits the diffusion member 8, it is guided to the optical path folding mirror 19. The laser beam P of blue component reflected on the optical path folding mirror 19 is guided to the optical path composite optical element 9.

The laser beam P of blue component transmitting the optical path composite optical element 9 is focused by the focusing lens 16 as already described and is guided to the light tunnel 17 after transmitting the fan-shaped area 10a of the color component switching disc 10.

Figure 5:
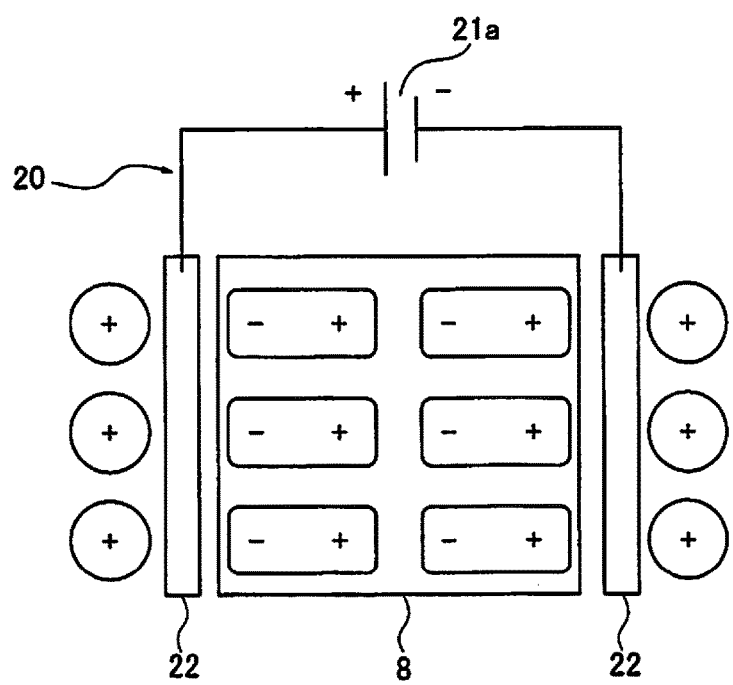
FIG. 5 is an explanatory view illustrating one example of an electrostatic capacitance detecting sensor illustrated in FIG. 1.

A capacitance detecting sensor 20 used as a detection element is disposed close to the diffusion member 8, as shown in FIG. 5. Here, the capacitance detecting sensor 20 includes a pair of electrodes 22, 22 provided at both ends of the diffusion member 8 and a voltage applier 21a.

When a predetermined voltage is applied to the pair of electrodes 22, 22 by the voltage applier 21a, the dielectric is polarized in positive (+) and negative (−) to be equivalent to a condenser, since the diffusion member 8 is a dielectric. A capacitance accumulated in the condenser is proportional to a dielectric constant of the condenser.

In general, a dielectric constant in air is 1. For example, when a part of the diffusion member 8 existing between the pair of electrodes 22, 22 does not function for breakage, aging, or deviation, the capacitance of the diffusion member 8 is reduced, because a dielectric constant of a glass is 3 to 10. Whether the diffusion member 8 exists in a normal state in the traveling optical path of the laser beam P can be thereby detected.

In other words, the capacitance detecting sensor 20 detects the deviation of the diffusion member 8 from the traveling optical path of the laser beam P and the breakage of the part of the diffusion member 8 due to an impact of unanticipated falling etc. of an image projection apparatus described later, or the change from a normal state to an abnormal state of the diffusion member 8 due to a crack etc. caused by the aging of the diffusion member 8, as a variation in the capacitance, and outputs a state detecting signal to a controller described later.

The capacitance detecting sensor 20 is connected to the controller 30 shown in FIG. 1. The controller 30 has a predetermined threshold value to determine whether the diffusion member 8 exists in the traveling optical path of the laser beam P in the normal state and includes an abnormal state determiner 30*a* to determine an abnormal state of the diffusion member 8 by comparing the threshold value with the state detecting signal.

Figure 6:
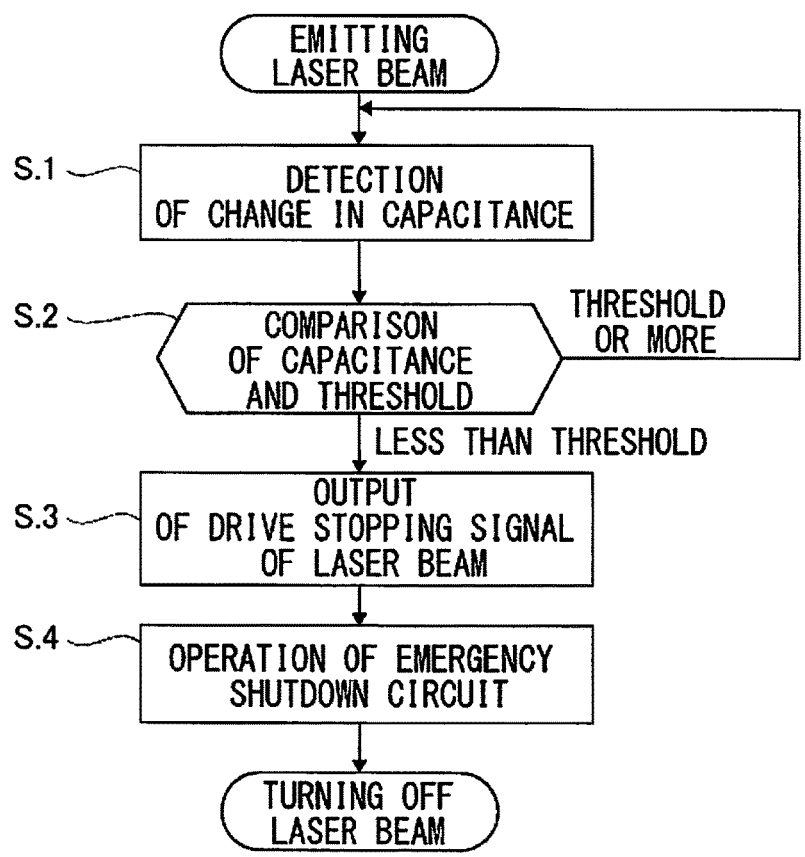
FIG. 6 is a flow chart for explaining operation of the light source device according to Embodiment 1 of the present invention.

The abnormal state determiner 30*a* determines whether the diffusion member 8 is in the abnormal state by comparing the threshold value with the state detecting signal, and outputs a laser beam drive stopping signal to the light source section 1 when it is determined that the diffusion member 8 is in the abnormal state. FIG. 6 illustrates a flow chart for explaining operation of the controller 30. One example of the control is described hereinafter in accordance with the flow chart.

The controller 30 rotates and drives the stepping motors 4, 6, and 15 when a not-shown power source is turned on, and drives the light source section 1 by a not-shown light beam source driver to light the laser diode 1*a*.

The laser beam P of blue component, the fluorescence G of green component, and the fluorescence R of red component are thereby in a state to be capable of being generated. In addition, the capacitance detecting sensor 20 is in a state to be capable of detecting the variation in the capacitance (S.1). The abnormal state determiner 30*a* then determines whether the capacitance is less than the threshold value by comparing the capacitance with the threshold value (S.2).

The abnormal state determiner 30*a* continues to drive the light source section 1 when the capacitance is the threshold value or more. The abnormal state determiner 30*a* determines that the diffusion member 8 is in the abnormal state and outputs a laser beam drive stopping signal of the light source section 1 to the light source section 1 (S.3) when the capacitance is less than the threshold value. An emergency shutdown circuit is provided in a not-shown power supplying circuit of the light source section 1. The emergency shutdown circuit shutdowns power supply to the laser diode 1*a* in response to the drive stopping signal, thereby stopping the drive of the laser diode 1*a* forcibly.

According to Embodiment 1, the abnormality of the setting of the diffusion member 8 is detected and the transmission of the laser beam P is stopped when the diffusion member 8 deviates from the traveling optical path of the laser beam P or a part of the diffusion member 8 is broken by receiving an impact on the light source due to falling etc. of the image projection apparatus or when the crack occurs in the diffusion member 8 for any cause. Therefore, the laser beam P can be securely prevented from leaking out of the light source device. As a result, the improvement in the safety to the human body can be further securely accomplished.

Here, although it is described to control to stop the drive of the laser diode 1*a*, the control may be configured to reduce a power output of the laser beam. Alternatively, the controller may be configured such that a shutter member shielding the laser beam is inserted in the traveling optical path of the laser beam P. Furthermore, the controller may be configured to generate a warning sound.

Embodiment 2

Figure 7:
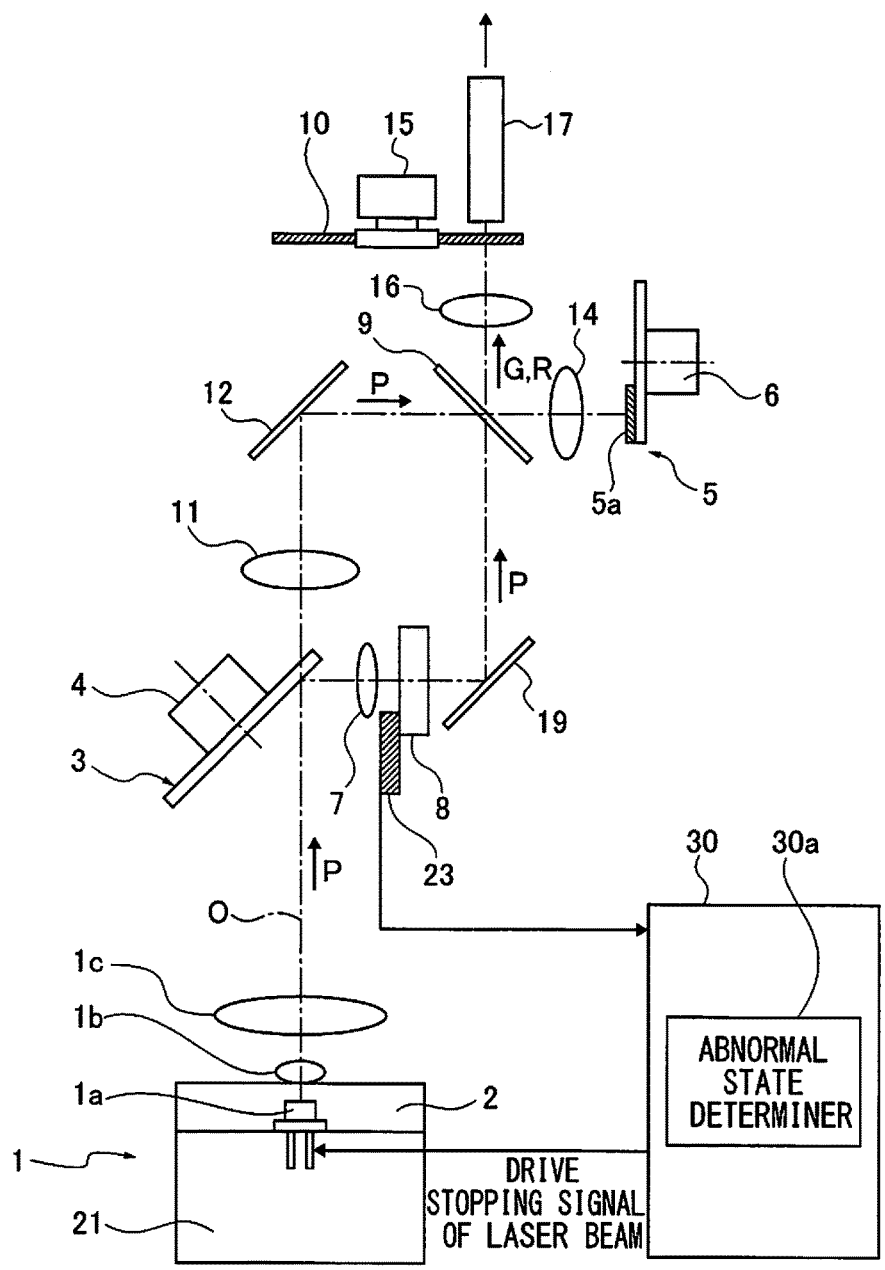
FIG. 7 is an optical view illustrating a main configuration of a light source device according to Embodiment 2 of the present invention.
Figure 8:
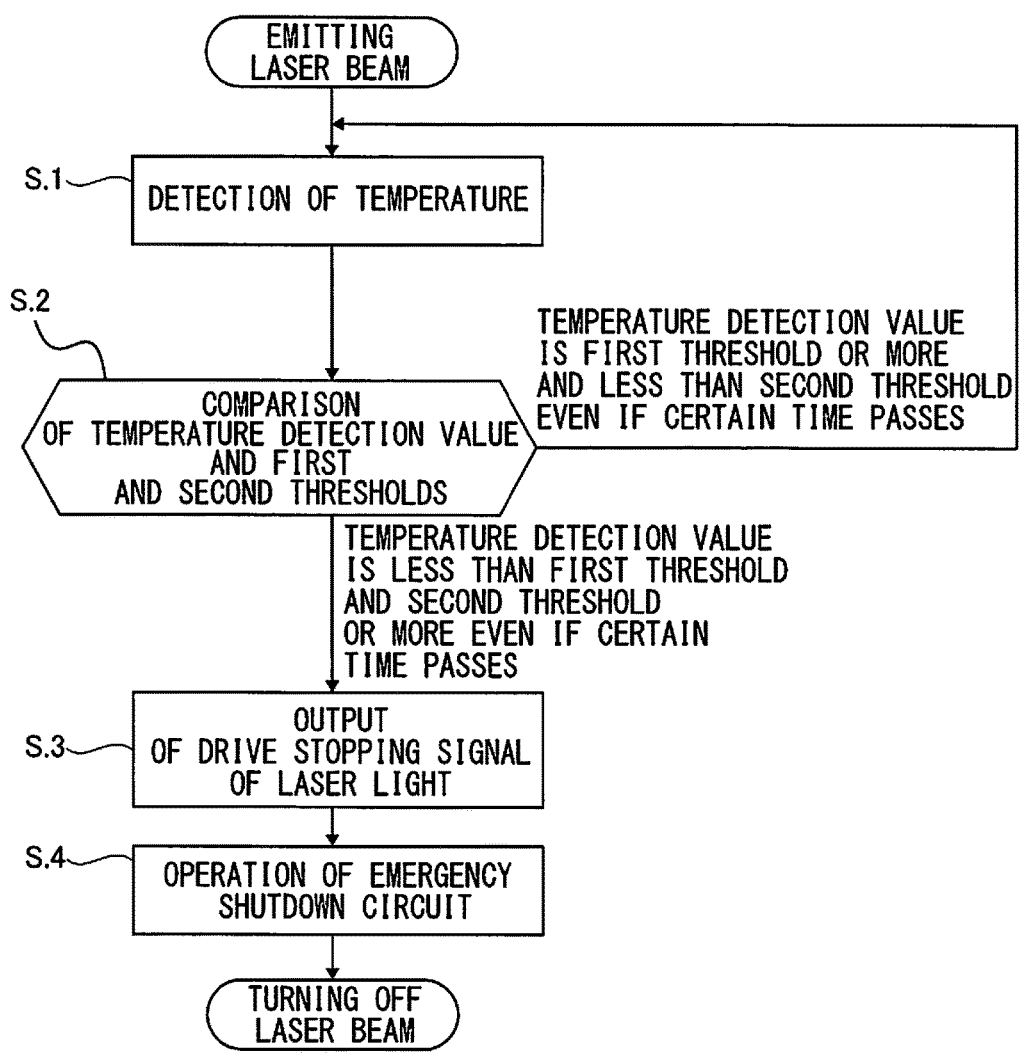
FIG. 8 is a flow chart for explaining operation of the light source device according to Embodiment 2 of the present invention.

FIGS. 7 and 8 are explanatory views of Embodiment 2 of the light source device according to the present invention. In FIG. 7, identical reference numerals are attached to similar components to that shown FIG. 1 and detailed descriptions thereof are omitted. Only different components are described.

In Embodiment 2, a temperature detecting sensor (thermistor) 23 is used as the detection element. The temperature detecting sensor 23 is disposed in contact with the diffusion member 8 not to disturb transmission of the laser beam P.

The diffusion member 8 may be a dielectric or may be not the dielectric, and has a physical characteristic in which a temperature is varied by radiation of the laser beam P. Transmissivity of the laser beam P to the diffusion member 8 is 97 to 98%, and 2 to 3% of the laser beam P is absorbed by the diffusion member 8 to be converted into heat energy.

The laser beam is converted in the heat energy when the laser beam P transmits the diffusion member 8. The variation in temperature rise of the diffusion member 8 can be thereby detected by the temperature detecting sensor 23. For example, when the abnormal state that the diffusion member 8 deviates from the traveling optical path of the laser beam P occurs, the variation in the temperature rise of the diffusion member 8 is not detected and a temperature detecting value detected by the temperature detecting sensor 23 decreases.

The temperature variation in the diffusion member in a direction where the temperature detecting value decreases is referred to as a first threshold. Further, when a part of the diffusion member 8 is broken, a crack, or the like occurs in the diffusion member, the temperature detecting value of the diffusion member 8 increases. The temperature variation of the diffusion member in a direction where the temperature detecting value increases is referred to as a second threshold.

The temperature detecting sensor 23 outputs the temperature detecting value of the diffusion member 8 to the controller 30 as the state detecting signal, and the abnormal state determiner 30*a* compares the predetermined first threshold, the predetermined second threshold, and the temperature detecting value. The controller 30 determines that the diffusion member 8 is in the abnormal state when the temperature detecting value is less than the first threshold or the temperature detecting value is the second threshold or more even if a certain time passes, and outputs the laser beam drive stopping signal to the light source section 1.

FIG. 8 is a flow chart for explaining operation of the controller 30. One example of the control is described hereinafter in accordance with the flow chart. The temperature detecting sensor 23 continues to detect the temperature variation of the diffusion member 8 (S.1). When the temperature detecting value by the temperature detecting sensor 23 is the first threshold or more and less than the second threshold after the certain time passes, it is determined that the diffusion member 8 exists in the traveling optical path of the laser beam P in a normal state and the drive of the light source section 1 is continued.

When the diffusion member 8 deviates from the traveling optical path of the laser beam P, the temperature detecting value remains less than the first threshold even if the certain time passes. On the other hand, when a part of the diffusion member 8 is broken or a crack occurs in the diffusion member 8, the temperature detecting value detected by the temperature detecting sensor 23 becomes the second threshold or more. The abnormal state determiner 30*a* determines that the diffusion member 8 is in the abnormal state when the temperature detecting value is less than the first threshold or the second threshold or more even if the certain time passes (S.2). The controller 30 outputs the laser beam drive stopping signal to the light source section 1 when it is determined that the diffusion member 8 is in the abnormal state (S.3). The emergency shutdown circuit is thereby operated (S.4).

Embodiment 3

Figure 9:
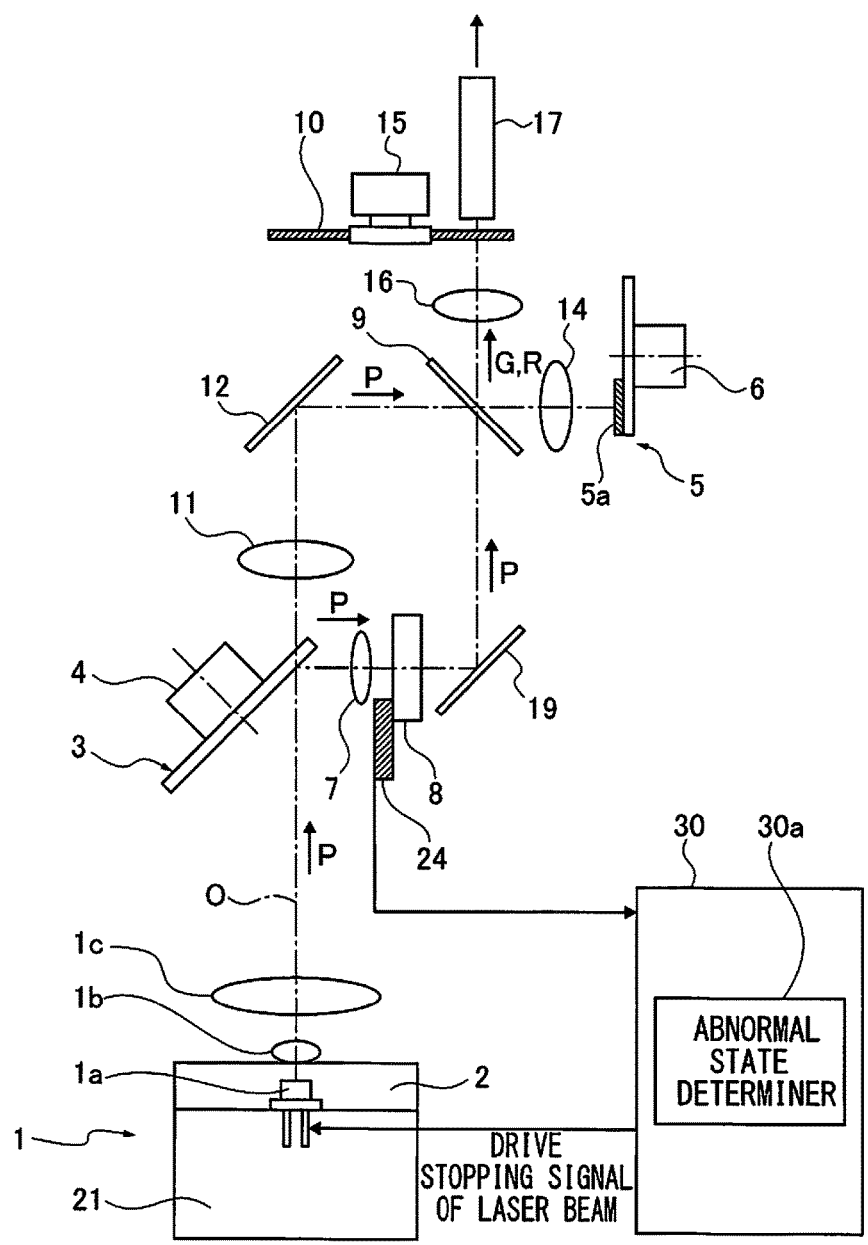
FIG. 9 is an optical view illustrating a main configuration of a light source device according to Embodiment 3 of the present invention.
Figure 10:
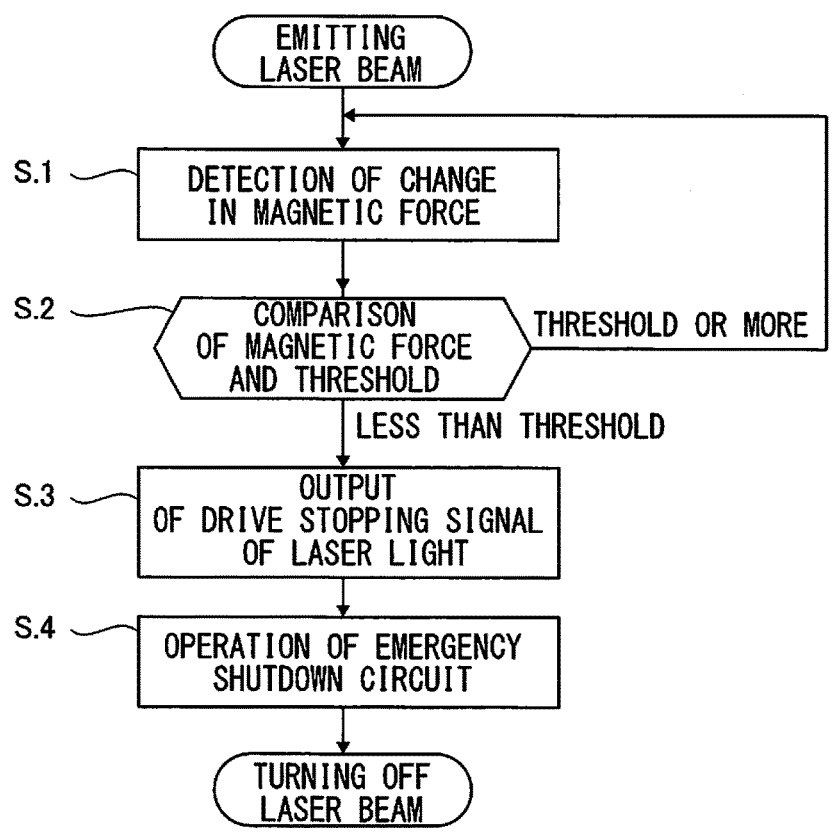
FIG. 10 is a flow chart for explaining operation of the light source device according to Embodiment 3 of the present invention.

FIGS. 9 and 10 are explanatory views of Embodiment 3 of the light source device according to the present invention. In FIG. 9, identical reference numerals are attached to similar components to that shown FIG. 1 and detailed descriptions thereof are omitted. Only different components are described.

In Embodiment 3, the diffusion member 8 is made of a light-transmitting member having magnetism. The diffusion member 8 is formed of a glass including highly-concentrated oxidation terbium. The diffusion member 8 maintains the light transmissivity and has a physical characteristic similar to that of a ferromagnetic body. A magnetic detection sensor 24 is used for the detection element. A hall element is used for the magnetic detection sensor 24, for example. The magnetic detection sensor 24 is disposed close to the diffusion member 8 not to disturb the transmission of the laser beam P.

The diffusion member 8 may be installed in a not-shown metallic frame. By installing the diffusion member 8 in the metallic frame, the diffusion member 8 is prevented from being deviated from the traveling optical path of the laser beam P due to an impact. A diffusion function of the diffusion member 8 is the same as in Embodiments 1 and 2.

When the diffusion member 8 exists in the traveling optical path of the laser beam P in the normal state, a detection output by the magnetic detection sensor 24 exceeds the threshold. When deviation of, breakage of a part of, or a crack in the diffusion member 8 occurs, a detection output value of the magnetic detection sensor 24 decreases.

The detection output of the magnetic detection sensor 24 is input into the controller 30 as the state detecting signal. The controller 30 outputs the laser beam drive stopping signal to the light source section 1 when the abnormal state determiner 30a compares the detection output with a threshold and determines that the diffusion member 8 is in the abnormal state.

FIG. 10 is a flow chart for explaining operation of the controller 30. One example of the control is described hereinafter in accordance with the flow chart. The magnetic detection sensor 24 continues to detect a magnetic force of the diffusion member 8 (S.1). When the detection output by the magnetic detection sensor 24 is the threshold or more (S.2), it is determined that the diffusion member 8 exists in the traveling optical path of the laser beam P in the normal state, and the drive of the light source section 1 is continued.

When the deviation of the diffusion member 8 from the traveling optical path of the laser beam P, the breakage, or the crack of the diffusion member 8 occurs, the detection output detected by the magnetic detection sensor 24 becomes less than the threshold and the abnormal state determiner 30adetermines that the diffusion member 8 is in the abnormal state (S.2). When the abnormal state determiner 30a determines that the diffusion member 8 is in the abnormal state, the controller 30 outputs the drive stopping signal to the light source section 1 (S.3). The emergency shutdown circuit is thereby operated (S.4).

Embodiment 4

Figure 11:
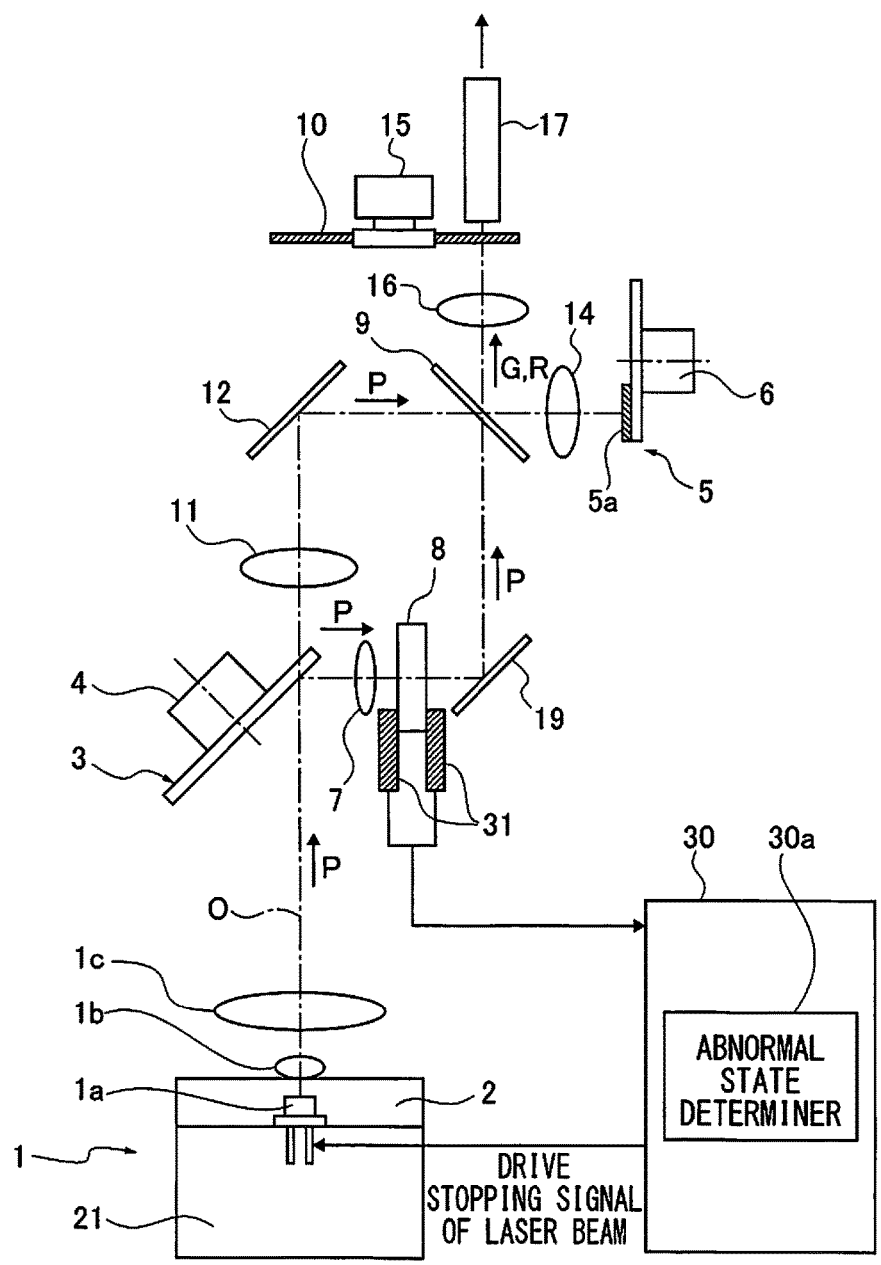
FIG. 11 is an optical view illustrating a main configuration of a light source device according to Embodiment 4 of the present invention.
Figure 12:
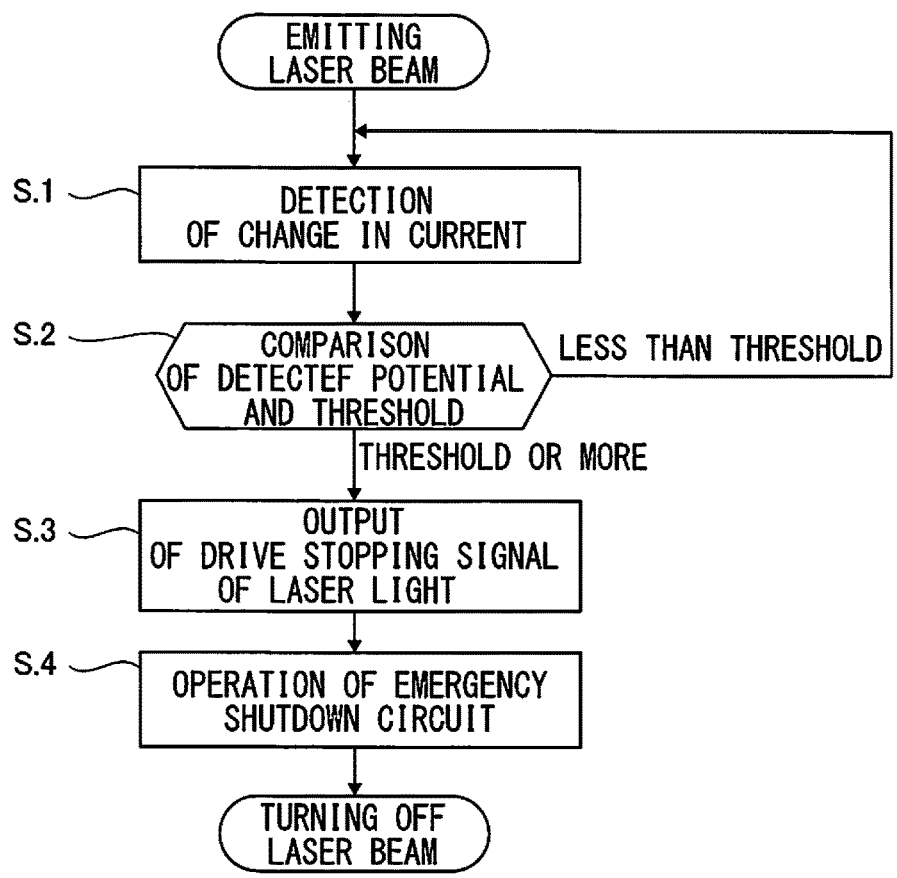
FIG. 12 is a flow chart for explaining operation of the light source device according to Embodiment 4 of the present invention.

FIGS. 11 and 12 are explanatory views of Embodiment 4 of the light source device according to the present invention. In FIG. 11, identical reference numerals are attached to similar components to that shown FIG. 1 and detailed descriptions thereof are omitted. Only different components are described.

In Embodiment 4, a light-transmitting member having electrical conductivity is used for the diffusion member 8. For example, a transparent plastic having electrical conductivity as a physical characteristic is used as the light-transmitting member. A pair of electrode plates 31, 31 used as a detection element is disposed to come in contact with both surfaces of the diffusion member 8 not to disturb the transmission of the laser beam P.

The detection element is configured with a potential detection sensor. The potential detection sensor can detect potential by the pair of electrode plates 31 based on a current value flowing in the diffusion member 8, and the potential is input into the controller 30 as the state detecting signal.

In the case where the diffusion member 8 is deviated from the traveling optical path of the laser beam P, a part of the diffusion member 8 is broken, or a crack occurs in the diffusion member 8, a detected potential detected by the potential detection sensor increases. A detection output of the potential detection sensor is input into the controller 30.

The abnormal state determiner 30a compares the detected potential with a threshold. The controller 30 outputs the laser beam drive stopping signal to the light source section 1 when the potential is the threshold or more. The drive of the light source section 1 is thereby stopped.

FIG. 12 is a flow chart for explaining operation of the controller 30. One example of the control is described hereinafter in accordance with the flow chart. The potential detection sensor continues to detect the potential of the diffusion member 8 (S.1). When the detected potential detected by the potential detection sensor is less than the threshold, it is determined that the diffusion member 8 exists in the traveling optical path of the laser beam P in the normal state, and the drive of the light source section 1 is continued.

When the deviation of the diffusion member 8 from the traveling optical path of the laser beam P, the breakage, or the crack of the diffusion member 8 occurs, the detected potential detected by the potential detection sensor becomes less than the threshold and the abnormal state determiner 30a determines that the diffusion member 8 is in the abnormal state (S.2). When the abnormal state determiner 30 determines that the diffusion member 8 is in the abnormal state, the controller 30 outputs the laser beam drive stopping signal to the light source section 1 (S.3). The emergency shutdown circuit is thereby operated (S.4).

Although detecting the potential of a light-transmitting body having conductivity is described in this embodiment, a configuration that a current detecting sensor detecting a variation in a current flowing in the light-transmitting body detects a variation in current, or a configuration that a resistance detecting sensor detects a resistance variation based on the variation in the current flowing in the light-transmitting body may be taken.

Even in Embodiments 2 to 4, when the deviation, the breakage, or the crack of the diffusion member 8 occurs, it is determined that the setting state of the diffusion member 8 is in an abnormal state. It is therefore possible to securely prevent the laser beam P from leaking out of the light source device by stopping the transmission of the laser beam P immediately. It is therefore possible to further contribute to the improvement in the safety to the human body and securely ensure the safety.

Embodiment 5

Figure 13:
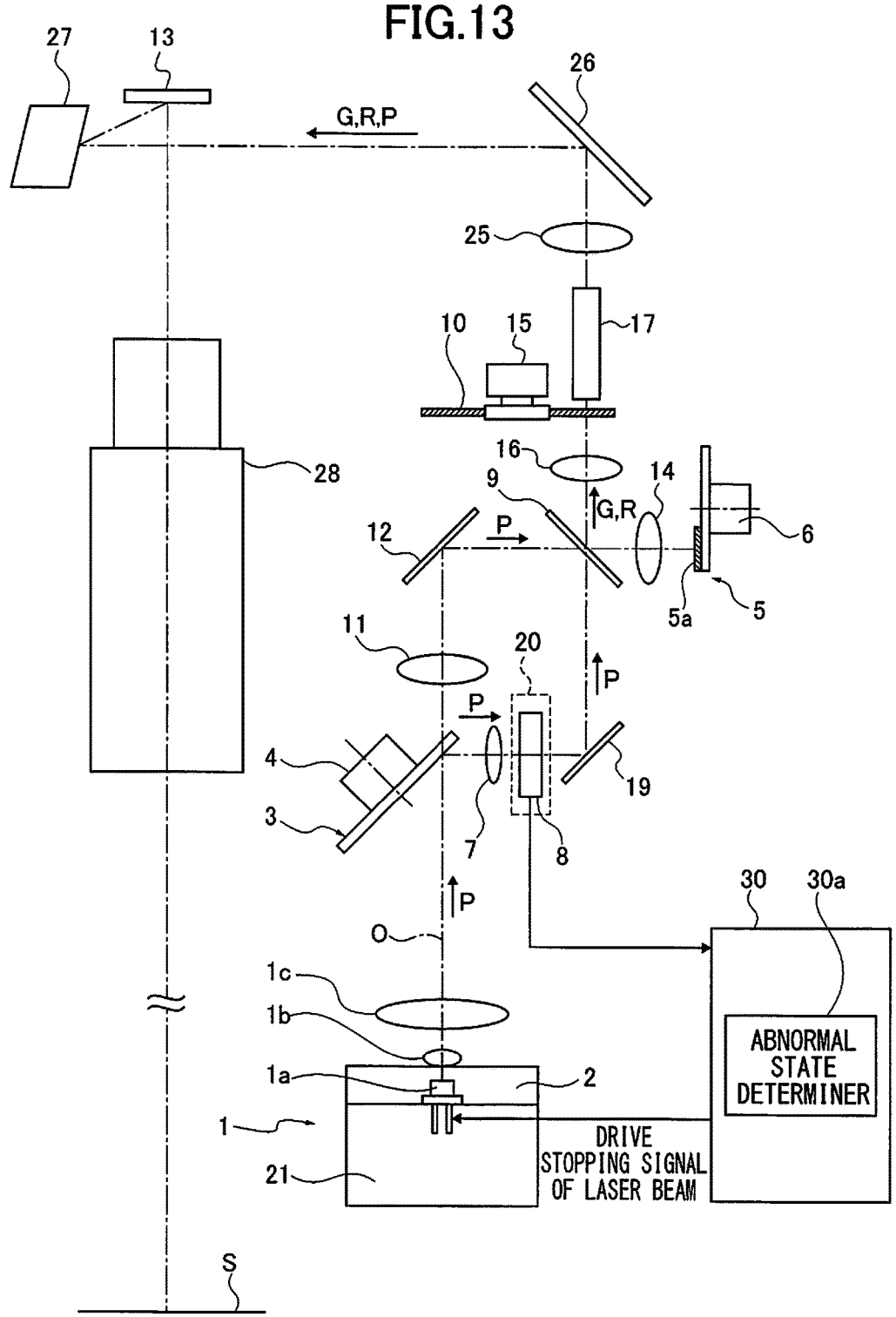
FIG. 13 is an optical view schematically illustrating one example of an image projection apparatus according to Embodiment 5 of the present invention.

FIG. 13 is a schematic view illustrating a schematic configuration of an image projection apparatus in which the light source device according to Embodiment 1 of the present invention is installed. In the light source device in FIG. 13, identical reference numerals are attached to similar components to that shown in FIG. 1 and detailed descriptions thereof are omitted. Only different components are described.

The laser beam P of blue (B) component, the fluorescence of green (G) component, and the fluorescence of red (R) component which are guided to the light tunnel 17 are focused by a focusing lens 25 to be a parallel luminous flux, The parallel luminous flux is guided to an image forming panel 13 such as a known digital micro mirror device (DMD) etc., through an optical path folding mirror 26 and a reflection mirror 27.

The image forming panel 13 is controlled by an image generator 18. Image data are input into the image generator 18, and a modulating signal is input into the digital micro mirror device (DMD) in accordance with the image data.

Each of micro mirror displaying elements of the digital micro mirror device is modulated according to the image data, and light of each color component is thereby reflected on the image forming panel 13 and projected on a screen S as image forming light through a projection lens system 28. As a result, a color image is enlarged and formed on the screen S. Here, the image forming panel 13 having a reflection type in which an image is formed according to the modulating signal is described in this embodiment. However, a transmission-type image forming panel may be used.

According to the image projection apparatus, the laser beam P from the light source section 1 is scattered on the fluorescent film 5a, or even if it is not scattered on the fluorescent film 5a, it is scattered on the diffusion member 8. Therefore, there would be no problem in the safety to the human's eyes as long as the diffusion member 8 is set in the normal state of the laser beam P.

In the case where an abnormal situation such as aging deterioration of the diffusion member 8, an impact due to falling of the image forming apparatus or an impact from an exterior, breakage of the diffusion member 8 due to vibration, or deviation of the diffusion member 8 from the traveling optical path of the laser beam P occurs, the abnormal state of the diffusion member 8 is detected by the detection element. Accordingly, the drive of the light source section 1 can be stopped, and therefore the laser beam P can be prevented from leaking out of the image projection apparatus.

This application is based upon and claims the benefit of priority to Japanese Patent Application No. 2014-55347, filed on Mar. 18, 2014, the entire disclosure of which is incorporated herein by reference.

The invention claimed is:

1. A light source device comprising:
a light source section to emit a laser beam;
a light quality member to reduce light quantity unevenness of the laser beam;
a light diffuser, provided in a traveling optical path of the laser beam between the light source section and the light quality member, to diffuse the laser beam, wherein the light diffuser includes a dielectric;
a sensor, including a capacitance detecting sensor, to detect a physical characteristic of the light diffuser as a variation in capacitance based on a dielectric constant of the dielectric and to output a state detecting signal; and
a controller to determine an abnormal state of the light diffuser based upon the state detecting signal.

2. The light source device of claim 1, wherein the sensor includes a temperature detecting sensor to detect a physical characteristic of the light diffuser based on a variation in temperature of the light diffuser.

3. The light source device of claim 1, wherein the light diffuser includes a light-transmitting member having magnetism, and
the sensor includes a magnetic detection sensor to detect the physical characteristic of the light diffuser based on a variation in a magnetic force of the light diffuser.

4. The light source device of claim 1, wherein the light diffuser includes a light-transmitting member having electric conductivity, and
the sensor includes a potential detecting sensor including an electrode plate coming in contact with the light diffuser and is configured to detect the physical characteristic of the light diffuser as a variation in potential.

5. The light source device of claim 1, wherein the light diffuser includes a light-transmitting member having electric conductivity, and
the sensor includes a current detecting sensor including an electrode plate coming in contact with the light diffuser and is configured to detect the physical characteristic of the light diffuser as a variation in a current flowing in the light-transmitting member.

6. The light source device of claim 1, wherein the light diffuser includes a light-transmitting member having electric conductivity, and
the sensor includes a resistance detecting sensor including an electrode plate coming in contact with the light diffuser and is configured to detect the physical characteristic of the light diffuser as a variation in a resistance of the light-transmitting member.

7. The light source device to of claim 1, further comprising:
an optical path switcher to switch a traveling optical path of the laser beam emitted from the light source section to a first optical path where the light diffuser is provided or to a second optical path where a phosphor, configured to be excited by the laser beam emitted from the light source section and to generate fluorescence, is provided between the light source section and the light diffuser in the traveling optical path.

8. The light source device of claim 1, further comprising:
a light source driver to drive the light source section; and
a controller to forcibly stop driving of the light source driver to stop an output of the laser beam upon, the abnormal state being determined.

9. An image projection apparatus, comprising:
the light source device of claim 1;
an image generator to generate an image forming light by modulating the laser beam diffused by the light diffuser; and
a projection lens system to project the image forming light generated by the image generator.

10. An image projection apparatus comprising:
a light source section to emit a laser beam;
a light diffuser, provided in a traveling optical path of the laser beam, to diffuse the laser beam, wherein the light diffuser includes a dielectric;
a sensor, including a capacitance detecting sensor, to detect a physical characteristic of the light diffuser as a variation in capacitance based on a dielectric constant of the dielectric and to output a state detecting signal; and
a controller to determine an abnormal state of the light diffuser based upon the state detecting signal;
an image generator to generate an image forming light by modulating the laser beam diffused by the light diffuser; and
a projection lens system to project the image forming light generated by the image generator.

11. A light source device comprising:
a light source section to emit laser beam;
a light quality member to reduce light quantity unevenness of the laser beam;

a light diffuser, provided in a traveling optical path of the laser beam between the light source section and the light quality member, to diffuse the laser beam, wherein the light diffuser includes a light-transmitting member having magnetism;

a sensor, including a magnetic detection sensor, to detect a physical characteristic of the light diffuser based on a variation in a magnetic force of the light diffuser and to output a state detecting signal; and a controller to determine an abnormal state of the light diffuser based upon the state detecting signal.

12. An image projection apparatus, comprising:

the light source device of claim 11;

an image generator to generate an image forming light by modulating the laser beam diffused by the light diffuser; and a projection lens system to project the image forming light generated by the image generator.

13. The light source device of claim 11, further comprising:

an optical path switcher to switch a traveling optical path of the laser beam emitted from the light source section to a first optical path where the light diffuser is provided or to a second optical path where a phosphor, configured to be excited by the laser beam emitted from the light source section and to generate fluorescence, is provided between the light source section and the light diffuser in the traveling optical path.

* * * * *